May 30, 1961 M. J. PIFER 2,986,600

PORTABLE TELEVISION RECEIVER

Filed Dec. 11, 1959 2 Sheets-Sheet 1

INVENTOR
Marion J. Pifer
BY
Michael Hertz
ATTORNEY

May 30, 1961 M. J. PIFER 2,986,600

PORTABLE TELEVISION RECEIVER

Filed Dec. 11, 1959 2 Sheets-Sheet 2

INVENTOR
Marion J. Pifer
BY
Michael Hertz
ATTORNEY 2,986,600

PORTABLE TELEVISION RECEIVER

Marion J. Pifer, Williamsville, N.Y., assignor to Sylvania Electric Products Inc., a corporation of Delaware Filed Dec. 11, 1959, Ser. No. 858,904

8 Claims. (Cl. 178—7.9)

This invention relates to portable television receivers and in particular to the handle structure and associated parts of the receiver.

It is an object of the invention to provide a structure which will easily permit the transportation of a chassis by means of a carrying handle thereon, when the chassis is removed from its cabinet, and which will also permit the transportation of the entire television receiver by the use of the same handle.

It is a further object of the invention to movably mount this carrying handle so that it is out of the way during normal use of the receiver but is easily accessible for transportation of the receiver or chassis.

It is a still further object of the invention to pivot the handle so that in non-use it will lie against a knob rail out of the way of the knob controls for the television set but acting as a guide for the fingers to lead them toward the knobs.

Other objects will become apparent upon consideration of the following specification and claims when taken in conjunction with the accompanying drawings in which:

Figure 1:
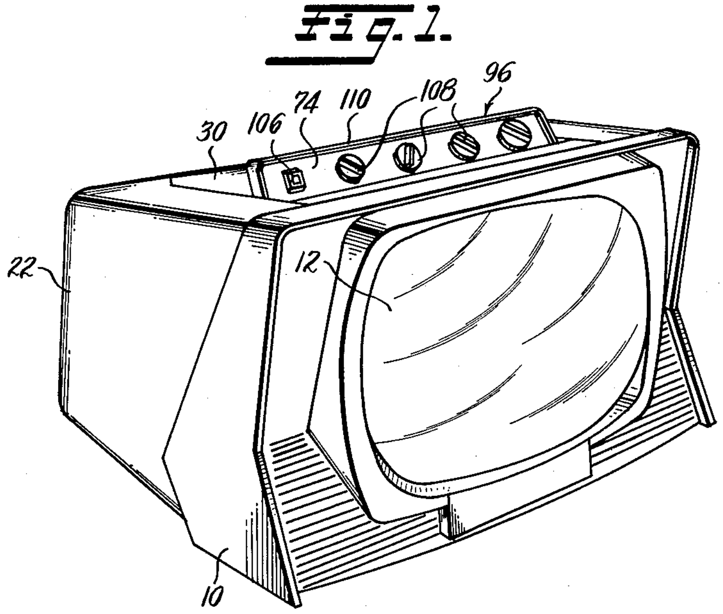
Fig. 1 is a perspective view of a television receiver.
Figures 2, 4, 5:
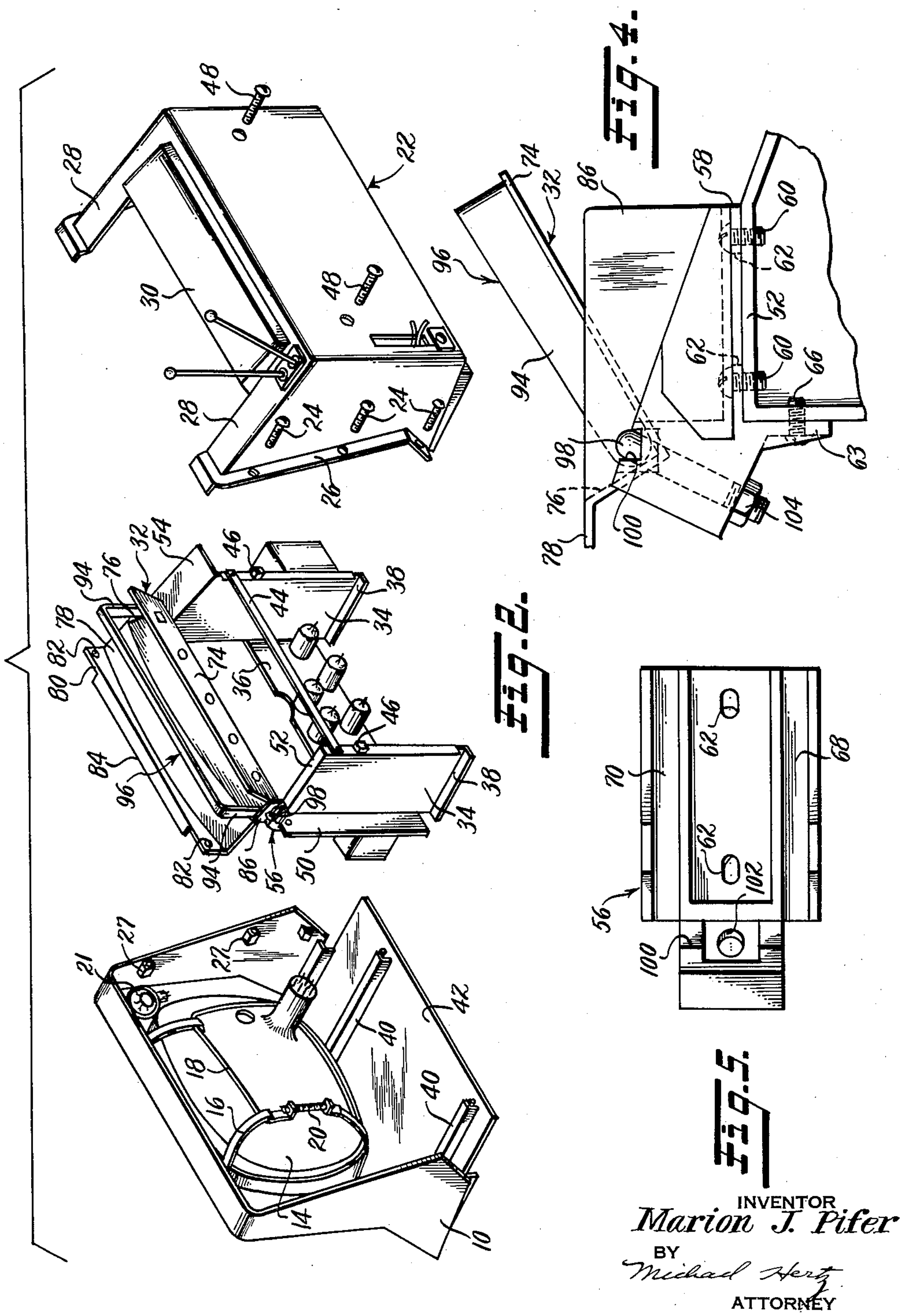
Fig. 2 is an exploded view of the receiver, many of the parts unessential to an understanding of the invention being removed.
Fig. 4 is a fragmentary side elevation of a mounting block and associated parts showing the carrying handle in its rest position.
Fig. 5 is a top view of a handle mounting block.

Referring to the drawings in greater detail, in Fig. 1 there is shown the television receiver, comprising a cabinet with a front section 10 of plastic material or the like and provided with a transparent mask 12, behind which is the cathode ray picture tube 14, see Fig. 2, held to the front cabinet section in any suitable manner, as by flexible arms 16 and wire harness 18 including a tightening screw or turnbuckle 20, the wire being threaded through hooked ends of the arms and tightened by means of the screw 20.

Also fastened to the front wall of the front cabinet section in any convenient fashion are one or more speakers 21.

Cooperating with the front cabinet section is the rear cabinet section 22, also of plastic material, suitable screws 24 being provided to fasten flanged edges 26 on the rear section to the front section, the screws being threaded into ears 27 or the equivalent fast with the front section of the cabinet, the flanges 26 resting against abutments such as the ears 27 inside the rear edges of the side walls of the front cabinet section. The top wall of the rear section is formed, in part, by two flanges 28 and by a web 30 at the rear of the section to leave, when the casing sections are jointed together, an open rectangular area at the top of the cabinet to accommodate a knob rail 32 of insulative character and associated parts mounted on the top of the chassis, as will be described.

The chassis comprises two vertical plates 34 with a cross web 36 at the lower portion of the plates, the plates and web affording supports for the mounting of the electron tubes, transformers, capacitors, resistances and other parts requisite for the proper functioning of the receiver but which need not be described here since they form no part of the invention. Each of the lower edges of the plates 34 is provided with a horizontal flange 38 adapted to engage with and slide in ways 40 fixed to the bottom 42 of the front casing section. The neck of the picture tube will then be accommodated in the space between the plates 34 and above the cross web 36. To strengthen the chassis, a tie rod 44 joins the plates near the upper ends thereof. To additionally hold the rear cabinet section in place, the rear flanged edges of the vertical plates are provided with screw sockets 46 of insulative material molded into the rear flange edges of the chassis or otherwise secured thereto, the screws 48 passing freely through the back of the rear section 22 of the cabinet and threaded into the insulating sockets. Since the chassis may be above ground potential, this arrangement provides against shock hazard should one touch the screws.

Figure 3:
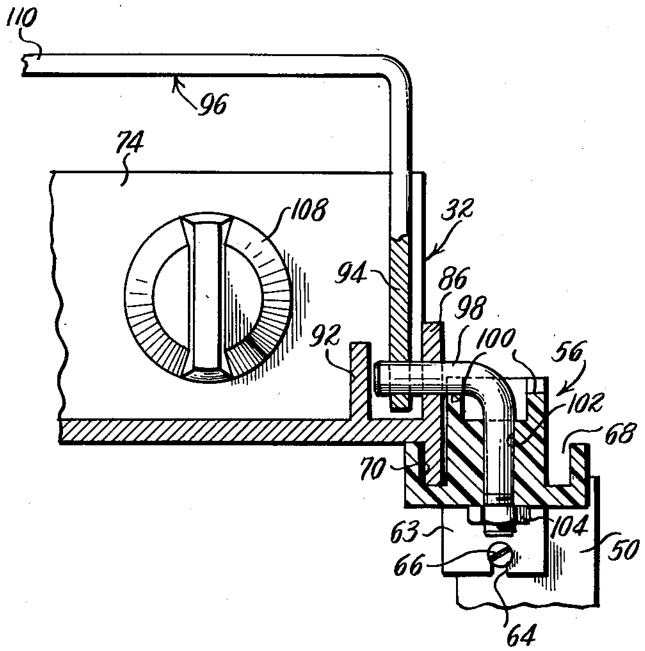
Fig. 3 is a fragmentary sectional view taken through a handle pivot, the handle being shown in a vertical plane.

Each of the front edges of the plates is provided with a wing 50, only one of which is visible in Fig. 2, to provide supports for electrical components in addition to those on the cross web. Also the top edges of the plates are flanged as indicated at 52 and 54. On the top flanges, at the front ends thereof, are affixed the handle pivot and knob rail supporting blocks 56. Each of these is made of a strong insulative material, as nylon, formed with a horizontal flange 58, see Fig. 4, screwed to the top plate flange 52 or 54 by screws 60 passing through elongated holes 62 in the blocks and each block is formed with a vertical flange 63 provided with a slot 64, Fig. 3, a screw 66 passing through the slot of the vertical flange and threading into a vertical face on the chassis, such as the wing 50. The top surface of each block is provided with two channels 68 and 70 each channel providing a horizontal web and upstanding flanges, the channels cooperating with a molded insulative knob rail 32. The rail, in cross section, is of V formation with two legs 74 and 76, see Fig. 2, the leg 76 being extended into a wide horizontal cover plate 78 terminating in a vertical flange 80 provided with screw holes 82 at its side portions through which screws may be freely passed to screw into mating sockets (not shown) in the front cabinet section. A horizontal guide flange 84 on the vertical flange 80 assists in assembling the chassis with the front cabinet section. At each of the two lateral ends of the rails and integral therewith there is a vertical end face plate 86 with its bottom edge seated against the web in the channel 70 of the block 56, the block being molded with two parallel channels 68 and 70 for alternative use on the left and right hand sides of the chassis.

At each end of the rail 32, in the V formation, there may be a reinforcing and guiding web 92 forming a pocket in between the web and plate 86 for the seating of the legs 94 of a metallic carrying handle 96, each of the legs pivoting on the horizontal arm of an L bolt 98 lying in a cross groove 100 in the upper face of the block 56 and whose inclined leg snugly fits in an inclined bore 102 in the block. The bolt is secured to the block by a nut 104 threaded onto the lower end of the bolt and bearing against the lower face of the block. The horizontal arms of the bolts also pass snugly through holes in the end face plates 86 to lock the knob rail and integrated portions in position relative to the chassis. Because of the intermediary of the nylon blocks 56 between the chassis and the handle, no injurious shock can be transmitted from the chassis to a person grasping the handle.

Controls for the receiver include a laterally displaceable on-and-off button 106 and rotatable control knobs 108, all carried by the knob rail 74 and protected against accidental breakage by the metal handle 96. When in non-use, the handle rests flat against the rail 74 with the straight bight 110 of the handle just flush with the top face of the wall 30 of the back cabinet section. Also the rail or handle when lying against the rail provides a slide guide for the fingers to easily reach any of the control knobs or the button 106.

It is apparent from the described construction that the handle 96 may be pivoted at any time to vertical operative position to transport the receiver. Furthermore, even when one or both cabinet sections have been removed, the chassis is still provided with the same handle, thus making it easy for a repairman to carry the chassis to desired locations, the chassis being easily separable from the front cabinet section upon removal of the screws passing through the holes 82 and sliding of the chassis along the ways 40. Of course the wiring to the picture tube and speaker are disconnectable as is the conventional practice. The control knobs and button need not be removed since the knob rail is fixed to the chassis and is removable therewith.

What is claimed as new is:

1. A portable television receiver comprising a cabinet with separable cabinet sections, a picture tube and television chassis within the cabinet and removable therefrom, fasteners securing the cabinet sections together with the picture tube and chassis supported therein, and a handle attached to the chassis and extending to the exterior of the cabinet for transportation of the receiver, or of the chassis alone when it is removed from the cabinet.

2. A cabinet comprising front and rear sections with an opening at the top of the cabinet extending between the sections, a chassis within the cabinet and removable therefrom, a knob rail fixed to the chassis positioned in the space between the sections, and a handle attached to the chassis and positioned above the knob rail and in the space between the front and rear sections of the cabinet.

3. A cabinet comprising a front section supporting a cathode ray tube and a rear section, fasteners removably securing the two sections together, the sections being formed to provide an opening at the top of the assembled cabinet, a chassis provided with a handle at its top within the cabinet with the handle exposed through the opening in the top of the cabinet and mechanism to removably secure the chassis in place within the cabinet.

4. A cabinet comprising a front section supporting a cathode ray tube and a rear cabinet section removably secured to the front section, the top wall of the rear section providing an open space, a chassis within the cabinet having a handle attached thereto at the upper end with the handle extending through the opening in the chassis, removable fasteners securing the chassis to the front section of the cabinet, guide ways on the bottom of said front section and flanges on the chassis cooperating with the ways to enable easy assembly and disassembly of the front section and chassis.

5. In a television receiver a cabinet comprising a front section supporting a cathode ray tube and a vertical chassis detachably secured therein, said chassis including a knob rail secured to the upper end of the chassis, control knobs for controlling the receiver carried by the knob rail, and a handle mounted on the upper end of the chassis to facilitate transport of both the chassis and cabinet section when the chassis is secured to the cabinet section or to facilitate transport of the chassis alone, when the chassis is detached from the cabinet section and a rear cabinet section enclosing the chassis and removably secured against movement relative to the front section.

6. In a television receiver, a vertical chassis, a pair of knob rail and handle mounting blocks fastened to the upper end of said chassis, each of said blocks including a channel having a horizontal web and vertical upstanding flanges and an inclined bore in the block in advance of the channel, said bore receiving an angled bolt with an inclined leg secured against longitudinal movement in the bore and a horizontal arm resting against the upper surface of the block and extending laterally beyond the block to serve as a pivot, a handle pivoted on the arms of the bolts, a knob rail mounting knobs to control parts on the chassis, said rail including two vertical end face plates, each plate lying in a channel in its associated block, each pivot arm of the bolts passing snugly through an aperture in the associated end face plate to hold the knob rail against displacement relative to the chassis.

7. In a television receiver, a vertical chassis, a pair of knob rail and handle mounting blocks fastened to the upper end of said chassis, each of said blocks including a channel with a horizontal web and vertical upstanding flanges and an inclined bore in the block in advance of the channel, said bore receiving an angled bolt with an inclined leg threaded at its lower end, said bolt having a horizontal arm engaging the top of said block, a nut threaded on the lower end of the inclined leg of the bolt and reacting against the lower surface of the block to draw the arm down against the upper surface of the block, a knob rail, V shaped in cross section to form two inclined walls, control knobs for the chassis carried by one wall of the rail, an end face plate on each end of the rail, each of said plates being threaded over the associated horizontal arm of the associated bolt and mounted in the channel of the associated block, and a handle freely pivoted on the arms of the bolts and normally resting against the wall mounting the control knobs.

8. In a television receiver, a vertical chassis, a pair of insulative knob rail and handle mounting blocks fastened to the upper end of said chassis, each of said blocks including a channel having a horizontal web and vertical upstanding flanges and an inclined bore in the block in advance of the channel, said bore receiving an angled bolt with an inclined leg secured against longitudinal movement in the bore and a horizontal arm resting against the upper surface of the block and extending laterally beyond the block to serve as a pivot, a metallic handle pivoted on the arms of the bolts, a knob rail mounting knobs to control parts on the chassis, said rail including two vertical end face plates, each plate lying in a channel in its associated block, and each pivot arm of the bolts passing snugly through an aperture in the associated end face plate to hold the knob rail against displacement relative to the chassis.

References Cited in the file of this patent

UNITED STATES PATENTS

| | | |
|---|---|---|
| 2,175,025 | Hooven | Oct. 3, 1939 |
| 2,514,246 | Knox | July 4, 1950 |
| 2,917,577 | Harman | Dec. 15, 1959 |